US010100419B2

(12) United States Patent
Guillet et al.

(10) Patent No.: US 10,100,419 B2
(45) Date of Patent: Oct. 16, 2018

(54) PRODUCTION OF NANO-ORGANIZED ELECTRODES ON POROUS SUBSTRATE

(75) Inventors: Nicolas Guillet, Chatuzange le Goubet (FR); Galdric Sibiude, Rivesaltes (FR)

(73) Assignees: Commissariat a L'Energie Atomique et aux Energies Alternatives, Paris (FR); King Saud University, Riyadh (SA)

( * ) Notice: Subject to any disclaimer, the term of this patent is extended or adjusted under 35 U.S.C. 154(b) by 1265 days.

(21) Appl. No.: 13/511,915

(22) PCT Filed: Nov. 25, 2009

(86) PCT No.: PCT/IB2009/007827
§ 371 (c)(1),
(2), (4) Date: Aug. 30, 2012

(87) PCT Pub. No.: WO2011/064614
PCT Pub. Date: Jun. 3, 2011

(65) Prior Publication Data
US 2012/0318675 A1 Dec. 20, 2012

(51) Int. Cl.
*B82Y 30/00* (2011.01)
*C25D 5/02* (2006.01)
*C25D 1/04* (2006.01)
*B82Y 40/00* (2011.01)
*H01M 4/86* (2006.01)
*H01M 4/88* (2006.01)
*H01M 4/90* (2006.01)
*H01M 4/92* (2006.01)
*C25D 1/00* (2006.01)

(52) U.S. Cl.
CPC ............... *C25D 1/04* (2013.01); *B82Y 30/00* (2013.01); *B82Y 40/00* (2013.01); *C25D 1/006* (2013.01); *H01M 4/8668* (2013.01); *H01M 4/8807* (2013.01); *H01M 4/8853* (2013.01); *H01M 4/8896* (2013.01); *H01M 4/9075* (2013.01); *H01M 4/9083* (2013.01); *H01M 4/92* (2013.01); *H01M 4/925* (2013.01); *H01M 4/926* (2013.01)

(58) Field of Classification Search
CPC ... C25D 5/50; C25D 5/02; C25D 5/00; C25D 1/04; H01M 4/92; H01M 4/925; Y02E 60/50; B82Y 30/00
USPC .................................. 205/122; 977/762, 890
See application file for complete search history.

(56) References Cited

U.S. PATENT DOCUMENTS

| 2004/0126649 A1 | 7/2004 | Chen |
| 2006/0115711 A1 | 6/2006 | Kim |
| 2007/0138133 A1* | 6/2007 | Cha et al. ........................ 216/56 |
| 2007/0212538 A1* | 9/2007 | Niu ........................... H01B 1/04 428/367 |

OTHER PUBLICATIONS

Zhou et al. "A comparative study of carbon felt and activated carbon based electrodes for sodium polysulfide/bromine redox flow battery" Electrochimica Acta 51 (2006) 6304-6312.*
Choi et al. "Pt nanowires prepared via a polymer template method: Its promise toward high Pt-loaded electrocatalysts for methanol oxidation" vol. 53, Issue 19, Aug. 1, 2008, pp. 5804-5811.*
Kautek et. al., "Template Electrodeposition of Nanowire Arrays on Gold Foils Fabricated by Pulsed-Laser Deposition"; dated Dec. 20, 1994.
Schönenberger et. al., "Template Synthesis of Nanowires in Porous Polycarbonate Membranes: Electrochemistry and Morphology"; dated Nov. 27, 1997.
Lee et. al., "Growing Pt nanowires as a densely packed array on metal gauze": dated Aug. 9, 2007, Journal of the American Chemical Society, vol. 129; issue 35.
International Search Report; Written Opinion of the International Searching Authority; PCT/IB2009/007827, dated Nov. 11, 2010.
European Office Action for European Patent Application No. 09797157.6, dated Jul. 18, 2013, 3 pages.
European Office Action for European Patent Application No. 09797157.6, dated Feb. 12, 2014, 3 pages.
International Search Report; Written Opinion of the International Searching Authority; PCT/IB2009/007827, dated Nov. 22, 2010.

* cited by examiner

*Primary Examiner* — Zulmariam Mendez
(74) *Attorney, Agent, or Firm* — Alston & Bird LLP

(57) ABSTRACT

The invention relates to a method for fabricating nanowires and a method for fabricating an electrode of an electrochemical device. The nanowire fabrication method according to the invention comprises: a) a step of depositing, on one of the faces of the matrix comprising hole openings, at least one porous layer, having a porosity equal to or higher than 26% by volume, of nanoparticles of a conductive material having their smallest dimension at least equal to the diameter of the holes in the matrix, the nanoparticles being in electrical contact with one another, b) growing the nanowires in the holes of the matrix, and c) removing the matrix. The invention has an application in the field of electrochemical devices in particular.

11 Claims, No Drawings

PRODUCTION OF NANO-ORGANIZED ELECTRODES ON POROUS SUBSTRATE

FIELD

The invention relates to a method for fabricating nanowires and a method for fabricating electrodes.

It also relates to an electrode obtained by the nanowire fabrication method of the invention and an electrical method device comprising such an electrode, such as a fuel cell.

BACKGROUND

Energy related technologies such as fuel cells, batteries, gas sensors, etc. are often based on heterogeneous gas-solid or liquid-solid reactions, and require very good circulation of the reactants and reaction products.

These devices (fuel cells, batteries, gas sensors) are based on redox reactions and comprise electrodes which must therefore also permit good circulation of the reactants and reaction products.

These electrodes comprise in particular a catalyst deposited on one of the elements of the electrode.

To optimize the efficiency of this catalyst, nano-electrodes organized at the nanometric scale are increasingly advantageous for many applications.

This is because conventional catalyst deposition techniques are not generally suitable for obtaining three-dimensional structures which are perfectly controlled, neither in terms of size, nor in terms of catalyst dispersion.

To overcome this drawback, Choi et al. proposed, in "*Pt nanowires prepared via a polymer template method: Its promise toward high Pt-loaded electrocatalysts for methanol oxidation*", Electrochimica Acta 53 (19):5804-5811, 2008 the use of a matrix to fabricate platinum nanowires which are then deposited on a substrate.

In this method, a polycarbonate matrix is fabricated, perforated in the thickness direction to form open holes on two opposite surfaces of the matrix.

It is in the holes of this matrix that the platinum catalyst is grown by electrochemical reduction of a platinum salt.

However, this method has a major limitation because it is necessary to deposit a dense, uniform and sufficiently thick layer of a conductive material on one of the faces of the matrix at which the orifices of the holes open.

It is necessary to deposit this layer to obstruct one end of the holes of the matrix and thereby allow the growth of the metal structures exclusively inside the holes of the matrix.

The matrix is then destroyed, leaving only the metal layer on which the metal structures (nanowires) (columns) are arranged vertically.

In fact, the dense and uniform metal layer, such as the one that is commonly deposited, that is a layer of gold, does not allow the proper circulation of the fluids required for the good circulation of the reactants and reaction products.

One solution, suggested by Choi et al., is to separate all the nanowires obtained from the metal layer and place them in suspension in a solution containing an organic binder, and then to deposit this suspension on a substrate which is generally nonporous.

However, this technique is not suitable for preserving the original nano-organization.

Other techniques serve to obtain metal wires on a porous substrate, but neither the size nor the dispersion of the wires can be easily controlled.

These techniques involve growing the nanowires on a platinum or titanium gauze or on carbon felts.

Such methods are described, in particular in Lee at al., "*Growing Pt nanowires as a densely packed array on metal gauze*", Journal of the American Chemical Society 129 (35): 10634, 2007.

SUMMARY

To overcome the problems of the prior art, the invention proposes preparing a nano-organized deposit of nanowires vertically oriented with regard to the porous support, said porous support-nanowire combination being used directly to fabricate an electrode.

For this purpose, the invention proposes a method for fabricating nanowires, comprising a step of growing the nanowires in the through-holes of a matrix, followed by the removal of the matrix, characterized in that it comprises the following steps:

a) depositing, on one of the faces of the matrix comprising hole openings, at least one porous layer, having a porosity equal to or higher than 26% by volume, of nanoparticles of a conductive material having their smallest dimension at least equal to the diameter of the holes in the matrix, the nanoparticles being in electrical contact with one another, b) growing the nanowires in the holes of the matrix, and c) removing the matrix.

Preferably, in the method of the invention, the density of the nanoparticles of the porous layer is at least equal to the density of the holes.

Also preferably, the nanowire fabrication method of the invention further comprises, between step a) and step b), a step a1) of assembling the face of the matrix covered with at least one layer of nanoparticles obtained in step a) with a porous support having a porosity higher than the porosity of the layer of nanoparticles formed in step a), the porous support being made from an electron-conducting material, and being in electrical contact with the nanoparticles of the at least one layer of nanoparticles deposited in step a).

Also preferably, in step a) the nanoparticles are maintained in electrical contact with one another, and immobilized on the face of the matrix, by a binder.

In this case, preferably, the binder is selected from fluorinated polymers, electronic polymers, polyvinyl acetate and mixtures thereof.

In a preferred embodiment of the inventive method, the nanoparticles are selected from nanoparticles of carbon black, conductive oxides, conductive polymers, metals and mixtures thereof.

As to the porous support, it is preferably selected from a metal gauze, carbon fabrics or felts, and felts of conductive materials.

Preferably, the matrix is made from a material selected from polycarbonate, polyester, nylon, nitrocellulose esters, sulfonated esters, cellulose acetate and mixtures thereof.

Also preferably, the nanowires are made from metal, metal oxide, or conductive polymer.

Also preferably, in the inventive method, step b) is an electrochemical deposition step.

Also preferably, in step b), the matrix with the layer of nanoparticles is joined to the porous support by pressing, heating, hot pressing, in situ polymerization, grafting or mechanical bonding.

The invention also proposes a method for fabricating an electrode of an electrochemical device, characterized in that it comprises the steps of fabricating nanowires according to the method of the invention.

DETAILED DESCRIPTION

The invention will be better understood and other features and advantages thereof will appear more clearly from a reading of the explanatory description that follows.

The nanowire fabrication method of the invention comprises depositing a layer on one face of a matrix traversed by holes, the face at which the holes open, in order to block these holes at the lower face, growing the nanowires in the holes of the matrix whereof one of the faces is thus blocked, and removing the matrix.

To solve the problem of the necessary porosity of the layers deposited on the face of the matrix to block one of the ends of the holes, the invention proposes plugging these holes using nanoparticles of which the smallest dimension must be at least equal to the largest dimension of the holes of the matrix, to avoid passing through the matrix, to be distributed on the surface of the matrix and to plug all the holes.

The holes of the matrix vertically perforate the thickness of the matrix.

In the context of the present invention, nanoparticles means a particle or an aggregate of particles, or an agglomerate of particle aggregates, having their largest dimensions smaller than 500 nm.

For the fabrication of metal nanowires, which is a preferred embodiment of the invention, the deposited layer of nanoparticles must allow the electric current to flow to all the nanoparticles dispersed on the matrix.

To obtain this good electric current distribution, and therefore good electrical percolation on the entire layer, the nanoparticles must be electrically connected together, either by direct contact, or indirectly via another material.

Thus, in the invention, a monolayer or a plurality of layers of stacked nanoparticles can be deposited.

The physical, morphological, size, specific surface area, and density properties are essential features to be taken into account for preparing the porous layer.

In fact, in all cases, in order to use the nanowires which are grown on the layer of nanoparticles, in particular in an electrode, the assembly of nanoparticle layers on which the nanowires have been grown must be porous and electronically conductive, which means that the layer formed by the nanoparticles must also be porous. More precisely, it must have a porosity equal to or higher than 26% by volume, that is the volume of the open pores of the nanoparticle layer must account for at least 26% of the total volume of this layer while having pores in the range of mesopores (2 to 50 nm) and macropores (>50 nm). The porosity is measured by weighing.

The nanoparticles can be made of any electronically conductive material.

In a preferred embodiment of the invention, the nanoparticles are made from carbon black, conductive oxide such as $IrO_2$, $SnO_2$, $TiO_2$, ITO, TiC, polymers of conductive polymer such as polyvinyl pyrroline (PVP), polyaniline (PANI) and polypyrrole (PPY), or metals such as Ti, Ag, and Au.

The nanoparticles forming the at least one layer deposited on the faces of the porous matrix, may have a wide size dispersion, for example, of small particles to plug the holes and large particles for the electric current distribution.

For example, commercially available matrices have hole diameters ranging from 10 nm to over 500 nm with densities ranging from $4.10^4$ to $6.10^8$ holes per $cm^2$.

The size of the nanoparticles used must be adapted to the diameter and density of the holes.

For a matrix having $4.10^8$ per $cm^2$ of 80 nm diameter, the smallest dimension of the nanoparticles of a conductive material must be at least equal to 80 nm, so that a nanoparticle plugs the orifice of a hole.

The matrix must also have an open porosity equal to or higher than 26% and a density of pores higher than $4.10^4$.

Since the holes are not always uniformly distributed on the matrix, it is preferable to select a nanoparticle size as close as possible to the hole diameter: these are the small particles mentioned above.

These nanoparticles must be in contact with one another and this contact can be provided by adding large particles, that is particles whereof the largest size is about 200 nm, for the electric current distribution.

Once again, these may be individual nanoparticles or aggregates of nanoparticles.

Thus, for the matrix described above having $4.10^8$ holes per $cm^2$ of 80 nm diameter, which was a commercial matrix of polycarbonate of the type GE Osmomic (Part #1222093), model #KN8CP04700), the nanoparticles selected were particles of carbon black of the Vulcan XC-72R type, comprising spherical nanoparticles of 30 to 50 nm in diameter forming aggregates having an average size of about 200 nm.

To disperse these carbon black nanoparticles properly, and also to disperse any nanoparticle, it is necessary to fabricate a suspension of these nanoparticles in a liquid medium.

In the case of carbon black nanoparticles, the suspension was prepared in a mixture of water and ethanol.

The suspension was then homogenized in an ultrasonic bath and then deposited on the matrix by suction.

The matrix plays the role of a filter through which the solvent flows.

This suction deposition method can be used for depositing all types of nanoparticles, regardless of their constituent material.

In the particular case of carbon black nanoparticles, they remain on the surface of the matrix.

Obviously, other techniques, such as deposition of the suspension by coating or by spraying, can also be used for depositing nanoparticles on the matrix surface.

The nanoparticles may in themselves have any shapes, such as spheres, needles, etc.

To maintain the cohesion of the layer of nanoparticles and its joining with the face of the matrix on which it is deposited, it is also often necessary to use a binder which keeps the particles in place on the face of the matrix.

In fact, after the solvent has evaporated from the suspension, by drying or any other means, the layer of nanoparticles must be maintained on the face of the matrix.

The binder must form a discontinuous layer in order to maintain a porous structure of the layer of nanoparticles deposited on the matrix. This binder may also be conductive and thereby allow the electrical connection of the nanoparticles.

The quantity of binder to be added depends on the characteristics of the layer of nanoparticles and, in particular, on the size thickness of the layer.

This binder is generally a polymer binder, here also, the quality of the binder to be added depends on the length of the polymer chains, its affinity with the nanoparticles used, that is its capacity for wetting the nanoparticles used, and the desired final porosity.

The binder must preserve its properties throughout the nanowire fabrication process, which requires the binder to have a chemical compatibility with the solvents used in the fabrication of the nanowires and also chemical stability with regard to the intended conditions of use of the nanowires.

In fact, as shown below, in the invention, the nanowires are not, as in the prior art, detached from the nanoparticle support layer, but used with this layer.

The binder must also withstand the matrix dissolution step.

Thus, various polymers can be used as binder. Among them, mention can be made of fluorinated polymers such as polytetrafluoroethylene (PTFE), polyvinylidene fluoride (PVDF), electronically conductive polymers such as polyaniline (PANI), polypyrrole (PPy), or even other polymers such as polyvinyl acetate (PVA).

The binder may be applied after deposition of the nanoparticle layer and after evaporation of the solvent.

In a preferred embodiment of the invention, however, the binder is first mixed with the nanoparticles, which enables to mix the nanoparticles intimately with the binder and to promote their immobilization on the matrix, while preventing the production of a continuous layer which would limit the porosity thereof.

In the case of the use of a commercial polycarbonate matrix of the GE type described above and carbon black particles of the Vulcan XC-72R type as described above, the binder selected is polytetrafluoroethylene (PTFE) in suspension in water added to various carbon black concentrations: 20 to 70% by weight of PTFE compared to the mass of carbon black plus binder.

Since PTFE is an electrically insulating polymer, high binder contents are prohibited to avoid the electrical insulation of certain zones of the nanoparticle layer.

Thus a compromise exists between good electrical conductivity, high porosity and good adhesion of the layer.

In the case of the above example, the maximum quantity of PTFE is 60% by weight, compared to the weight of PTFE plus nanoparticles.

The low preferred maximum thickness (100 nm to 10 μm) of the layer composed of nanoparticles and polymer binder implies that it does not always have sufficient mechanical properties to be directly used after removal of the matrix.

It may therefore be necessary to prepare an assembly of the matrix coated with its nanoparticle layer on one of its faces, with a porous material which can be handled more easily, that is which has sufficient stiffness and solidity.

This porous material must also be electrically conductive and be electrically connected to the nanoparticle layer, because it will also be used to fabricate the electrode. It can therefore also serve for electrical connection between the nanoparticles.

Moreover, the support material must have good chemical compatibility with the rest of the method, and particularly the removal of the matrix and the desired application.

It may have a widely variable porous structure. However, its porosity must be higher than that of the nanoparticle layer. As in the prior art, use can be made of metal gauze, for example made from Ti, Cu, Ni, Ir, Ta, Zr, carbon fabrics, felts of conductive materials such as metal felts having satisfactory mechanical properties for easy handling.

The size (mean diameter) of the pores of the support material must nevertheless allow good adhesion of the layer comprising nanoparticles and a good distribution of the electric current over the entire surface employed.

The nanowires are then grown, for example by electrochemical deposition, in the holes of the matrix which is then removed.

The porous support-nanoparticle layer combination or layer of nanoparticles on which the nanowires are grown, or simply, when sufficiently solid, the nanoparticle layer on which the nanowires are grown, is then used as electrode material for the fuel cell, in particular.

For a better understanding of the invention, an exemplary embodiment is now described.

EXAMPLE

A matrix of GE Osmomic type of polycarbonate (Part #1222093), model #KN8CP04700) having $4.10^8$ holes per $cm^2$ and a hole diameter of 80 nm was coated with carbon black nanoparticles of the Vulcan XC-72R type.

The nanoparticles were a mixture of spherical nanoparticles of 30 to 50 nm, some of them forming aggregates with a maximum size of about 200 nm.

For this purpose, the carbon black nanoparticles were placed in suspension in a water-ethanol-PTFE mixture.

The suspension was homogenized in an ultrasonic bath and then placed on a face of the matrix comprising hole orifices, by suction.

The quantity of PTFE was 60% by weight of the total weight of carbon nanoparticles plus PTFE. In this example, the total weight was 300 mg. Thus 120 mg of carbon nanoparticles and 180 mg of PTFE were used.

During the deposition at suction, the water and ethanol were removed.

The thickness of the layer obtained was 4 μm with a porosity 62.5%.

A carbon felt support having a porosity of 76% was then joined with the layer of nanoparticles and binder deposited on the face of the polycarbonate matrix, by hot lamination.

The temperature and pressure applied during the lamination were selected to soften the PTFE so that it would promote the electrical contact and be inserted between the fibres of the carbon felt, while avoiding any damage to the polycarbonate matrix.

In this example, the polycarbonate softening point was 140° C. for a pressure of 0.45 MPa and 128 to 138° C. for 1.8 MPa.

Under the same conditions, PTFE has softening points of 120° C. and 54° C.

Accordingly, a pressing was then applied at 135° C. under 1 MPa for 150 seconds.

Other assembly techniques are feasible depending on the polymers used: pressing only, heating only, in situ polymerization, "Velcro" type connection with nanofibres, etc.

A metal salt was then electrochemically reduced, in this case 5 mM $H_2PtCl_6$ in 0.5 M $H_2SO_4$ in the holes of the matrix.

The holes were gradually filled with metal and the reaction was stopped before completely filling the holes.

The matrix was then dissolved by immersion in an organic solvent, dichloromethane in this case.

This left only the structure comprising metal nanowires which were grown on the plugging nanoparticles joined together and to a porous support material by the polymer binder.

The electrodes thereby obtained can be used directly as electrodes for a gas sensor.

The electrode of the example was used to fabricate a half-cell composed of the samples/Nafion membrane/reference electrode containing mercurous sulfate.

The assembly was immersed in electrolyte composed of 0.5 M $H_2SO_4$.

A voltammetry measurement was then made: the values obtained with the sample of this example were far superior to those obtained with an Elat LT140EW, electrode, sold by the company BASF. This commercial electrode is widely used as reference for comparing performances. It is made according to a known deposit method of a catalyst based on platinated carbon (nanospheres of platinum of a diameter of about 5 nm on Carbon Vulcan XC72R, the nanospheres of platinum being obtained by the chemical reduction of a platinum salt—industrial process) on a commercial diffusion layer (LT1400W—BASF) comprising a deposit of a mixture of carbon+PTFE on a carbon fabric.

Thus, with the Elat LT140EW electrode, which comprises a load of 500 µg/cm$^2$ of platinum, the oxygen reduction obtained is identical to that obtained with the sample fabricated according to this example, but with a load of 312 µg/cm$^2$ of platinum.

The electrodes thus obtained can also be assembled directly with a proton-conducting membrane to fabricate a cell supplied on one side with hydrogen, and on the other side with oxygen, or with an ion-conducting membrane to fabricate a battery.

The results obtained with the electrodes in a half-cell assembly demonstrate a high gain, particularly from the standpoint of reducing the quantity of platinum required for optimal operation.

The invention claimed is:

1. Method for fabricating nanowires, comprising following steps:
   a) depositing, on one of the faces of a matrix comprising hole openings, at least one porous layer, having a porosity equal to or higher than 26% by volume and pores having a size between 2 to 50 nm and pores having a size greater than 50 nm, of nanoparticles of a conductive material having their smallest dimension at least equal to the diameter of the holes in the matrix, the nanoparticles being in electrical contact with one another, and then
   b) growing the nanowires in the holes of the matrix coated with the at least one porous layer of nanoparticles obtained in step a), and
   c) removing the matrix.

2. Method according to claim 1, wherein the method further comprises, between step a) and step b), a step a1) of assembling the face of the matrix covered with at least one layer of nanoparticles obtained in step a) with a porous support having a porosity higher than the porosity of the layer of nanoparticles formed in step a), the porous support being made from an electronic conducting material, and being in electrical contact with the nanoparticles of the at least one layer of nanoparticles deposited in step a).

3. Method according to claim 1, wherein in step a) the nanoparticles are maintained in electrical contact with one another, and immobilized on the face of the matrix, by a binder.

4. Method according to claim 3, wherein the binder is selected from fluorinated polymers, electronic polymers, polyvinyl acetate and mixtures thereof.

5. Method according to claim 1, wherein the nanoparticles are selected from nanoparticles of carbon black, conductive oxides, conductive polymers, metals and mixtures thereof.

6. Method according to claim 2, wherein the porous support is selected from a metal gauze, carbon fabrics or felts, and felts of conductive materials.

7. Method according to claim 1, wherein the matrix is made from a material selected from polycarbonate, polyester, nylon, nitrocellulose esters, sulfonated esters, cellulose acetate and mixtures thereof.

8. Method according to claim 1, wherein the nanowires are made from metal, metal oxide, or conductive polymer.

9. Method according to claim 1, wherein step b) is a step of electrochemical deposition.

10. Method according to claim 2, wherein in step a1), the joining of the matrix, with the layer of nanoparticles to the porous support, is carried out by pressing, or heating, or hot pressing, or polymerization or in situ, or grafting or mechanical bonding.

11. Method for fabricating an electrode of an electrochemical device, wherein the method comprises the steps of fabricating nanowires by the method according to claim 1.

* * * * *